(12) United States Patent
Padovano et al.

(10) Patent No.: US 11,364,692 B2
(45) Date of Patent: Jun. 21, 2022

(54) INTEGRATED PICK, PLACE AND FORMING APPARATUS AND METHOD FOR COMPOSITE CHARGES OVER COMPLEX GEOMETRIES

(71) Applicant: SPIRIT AEROSYSTEMS, INC., Wichita, KS (US)

(72) Inventors: Christopher James Padovano, Wichita, KS (US); Blaise Francis Bergmann, Wichita, KS (US); Christopher John Morrow, Wichita, KS (US); Allison Lynne Horner, Wichita, KS (US); Benjamin Wayne Ferrell, Wichita, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 0 days.

(21) Appl. No.: 17/206,312

(22) Filed: Mar. 19, 2021

(65) Prior Publication Data

US 2021/0206127 A1 Jul. 8, 2021

Related U.S. Application Data

(62) Division of application No. 16/679,963, filed on Nov. 11, 2019.

(51) Int. Cl.
| | |
|---|---|
| *B65G 47/91* | (2006.01) |
| *B29C 70/54* | (2006.01) |
| *B29C 70/34* | (2006.01) |
| *B25J 15/06* | (2006.01) |
| *B29C 64/209* | (2017.01) |

(52) U.S. Cl.
CPC .......... *B29C 70/542* (2013.01); *B29C 70/342* (2013.01); *B25J 15/0616* (2013.01); *B29C 64/209* (2017.08); *B65G 47/91* (2013.01)

(58) Field of Classification Search
CPC ...... B29C 70/44; B29C 70/532; B29C 70/542
See application file for complete search history.

(56) References Cited

U.S. PATENT DOCUMENTS

| | | | |
|---|---|---|---|
| 2010/0078126 A1* | 4/2010 | Brennan | ............... B29C 70/544 156/286 |
| 2012/0000597 A1* | 1/2012 | Astwood | ............... B29C 70/446 156/194 |

(Continued)

*Primary Examiner* — Scott W Dodds
(74) *Attorney, Agent, or Firm* — Hovey Williams LLP

(57) ABSTRACT

An apparatus for picking, placing, and forming a composite charge over a complex geometry tool comprises a first frame, a second frame, and a plurality of dynamic mechanisms. The first frame is formed from rigid material and includes a first frame member that forms at least a rectangular perimeter. The second frame is formed from flexible material and includes a second frame member that forms at least a rectangular perimeter. Each dynamic mechanism is connected to the first frame and the second frame and located along the perimeters of the first frame and the second frame. Each dynamic mechanism includes a length-variable component positioned between the first frame and the second frame, with at least a portion of the dynamic mechanisms configured to vary a length of the length-variable component for the second frame member to conform to the shape of the complex geometry tool.

6 Claims, 15 Drawing Sheets

(56) References Cited

U.S. PATENT DOCUMENTS

| | | | |
|---|---|---|---|
| 2014/0199153 A1* | 7/2014 | Reinhold | B65H 3/0816 |
| | | | 414/800 |
| 2019/0184693 A1* | 6/2019 | Johnson | B32B 37/1018 |
| 2020/0039092 A1* | 2/2020 | Reinhold | B65G 47/91 |

* cited by examiner

INTEGRATED PICK, PLACE AND FORMING APPARATUS AND METHOD FOR COMPOSITE CHARGES OVER COMPLEX GEOMETRIES

RELATED APPLICATIONS

The current patent application is a divisional patent application which claims priority benefit, with regard to all common subject matter, to U.S. patent application Ser. No. 16/679,963, entitled "INTEGRATED PICK, PLACE, AND FORMING APPARATUS AND METHOD FOR COMPOSITE CHARGES OVER COMPLEX GEOMETRIES", filed Nov. 11, 2019. The listed application is hereby incorporated by reference, in its entirety, into the current patent application.

FIELD OF THE INVENTION

Embodiments of the current invention relate to apparatuses and methods for forming composite parts with complex geometries.

DESCRIPTION OF THE RELATED ART

Composite material parts may be utilized in the manufacturing of aircraft to construct fuselages, among other components. One process of forming a composite material part begins with retrieving a composite material charge, such as composite material in the form of a sheet. The composite material charge is placed onto an upper surface of a tool which has a shape similar to the shape of the composite material part. A bag or sheet of flexible material is placed over the composite material charge and sealed to the surface of the tool around the edges of the charge. Vacuum is applied between the bag and the tool which presses the composite material charge against the upper surface. After vacuum is released, the composite material charge, which was flat or planar, now has the shape of the upper surface of the tool and is a formed composite material part.

Each step of the process is separate and distinct and may be performed by different teams and/or different pieces of equipment. Some steps may be performed manually. The result is a process that is labor intensive, time-consuming, and inefficient.

SUMMARY OF THE INVENTION

Embodiments of the current invention solve the above-mentioned problems and provide a single apparatus that can pick up a composite charge, place it on a tool, and form it to the shape of the tool to produce a formed composite part—thereby streamlining the composite part manufacturing process. The apparatus broadly comprises a robotic arm interface, a first frame, a second frame, and a plurality of dynamic mechanisms. The robotic arm interface is configured to couple to a robot which moves the apparatus. The first frame is coupled to the robotic arm interface. The first frame is formed from rigid material and includes a first frame member that forms at least a rectangular perimeter. The second frame is formed from flexible material and includes a second frame member that forms at least a rectangular perimeter. Each dynamic mechanism is connected to the first frame and the second frame and located along the perimeters of the first frame and the second frame. Each dynamic mechanism includes a length-variable component positioned between the first frame and the second frame, with at least a portion of the dynamic mechanisms configured to vary a length of the length-variable component for the second frame member to conform to the shape of the complex geometry tool.

Another embodiment of the current invention provides an apparatus for picking, placing, and forming a composite charge over a complex geometry tool. The apparatus comprises a robotic arm interface, a first frame, a second frame, a vacuum seal, a plurality of charge retainers, and a plurality of dynamic mechanisms. The robotic arm interface is configured to couple to a robot which moves the apparatus. The first frame is coupled to the robotic arm interface. The first frame is formed from rigid material and includes a first frame member that forms at least a rectangular perimeter. The second frame is formed from flexible material and includes a second frame member that forms at least a rectangular perimeter. The vacuum seal is formed from pliable material and connected to a lower surface of the second frame. The vacuum seal is configured to form an airtight seal between the second frame and the upper surface of the tool when the vacuum seal is pressed against the tool. The charge retainers are coupled to the first frame, with each charge retainer configured to utilize vacuum or suction to contact and retain the composite charge. Each dynamic mechanism is connected to the first frame and the second frame and located along the perimeters of the first frame and the second frame. Each dynamic mechanism includes a length-variable component positioned between the first frame and the second frame, with at least a portion of the dynamic mechanisms configured to vary a length of the length-variable component for the second frame member to conform to the shape of the complex geometry tool.

Yet another embodiment of the current invention provides a method for picking, placing, and forming a composite charge over a complex geometry tool. The method comprises the steps of lowering an apparatus including a plurality of charge retainers onto the composite charge so that the charge retainers contact and retain the composite charge; moving the apparatus and the composite charge to a forming tool; lowering the apparatus and the composite charge onto an upper surface of the tool so that a flexible frame of the apparatus contacts the tool and conforms to the shape of the tool and presses a vacuum seal against the tool; applying a vacuum through the vacuum seal so that a vacuum bag pulls the composite charge against the upper surface of the tool; and releasing the vacuum through the vacuum seal and raising the apparatus from the tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 14:
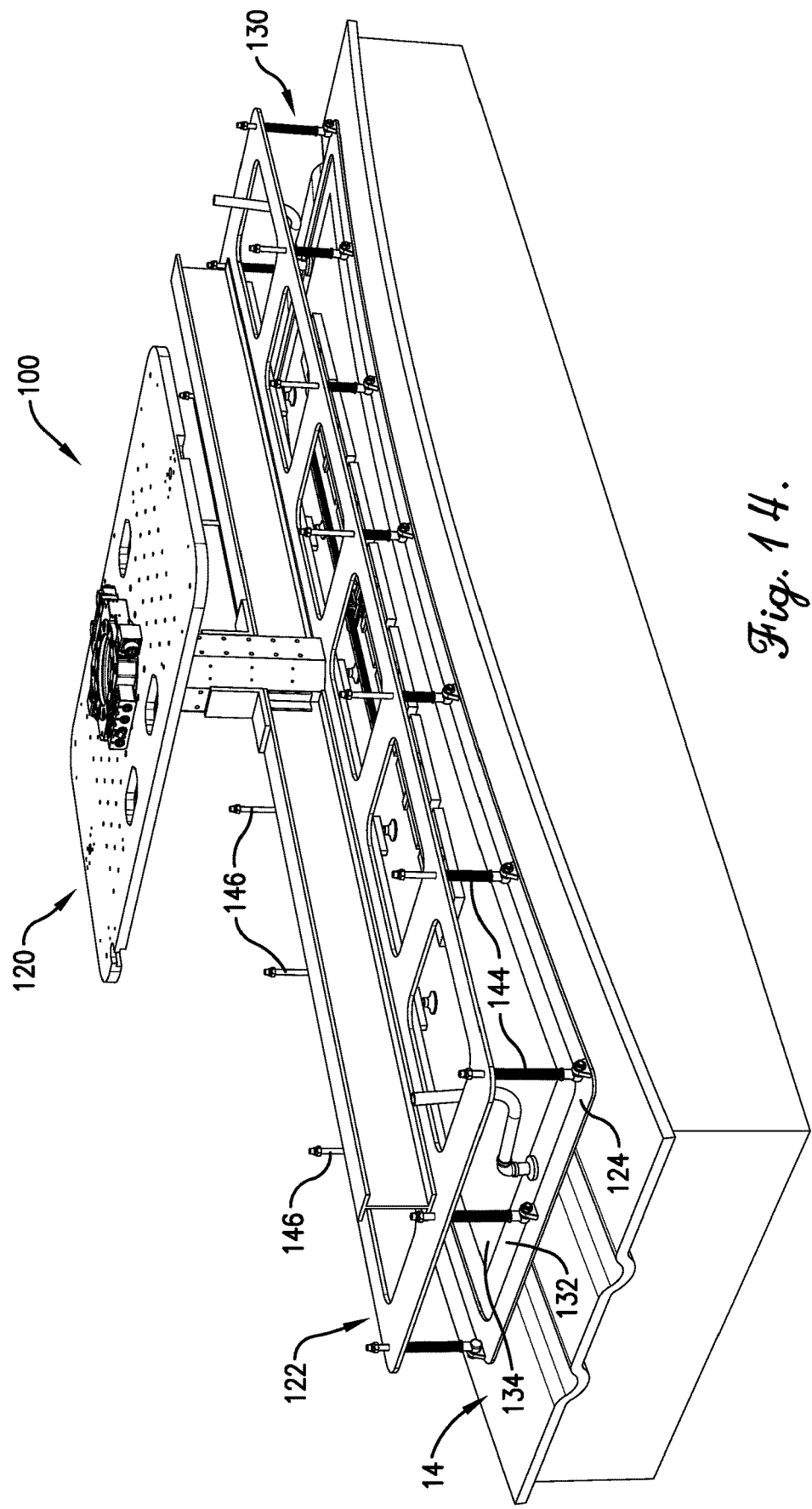
Figure 15:
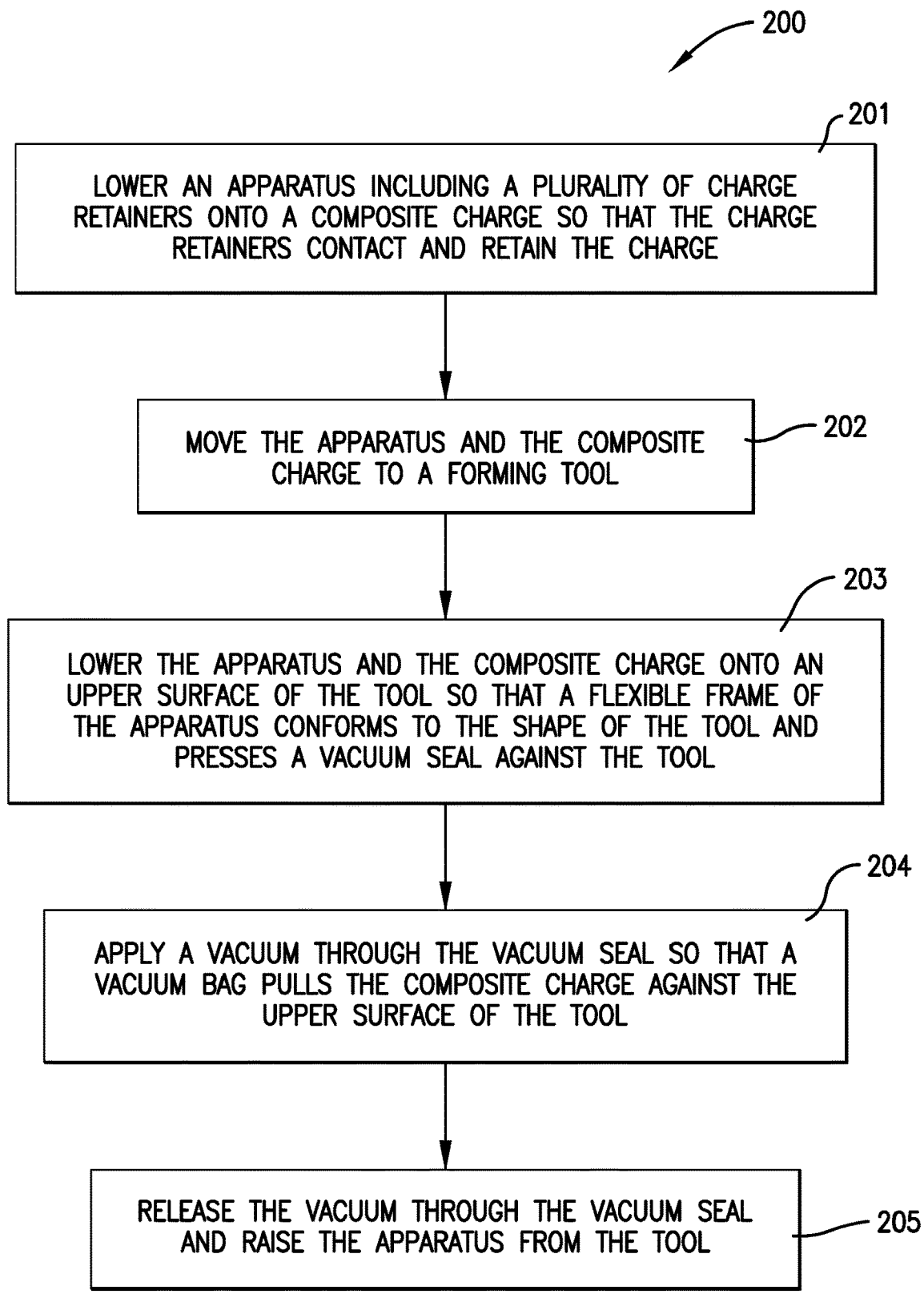

FIG. 14 is an upper perspective view of the second embodiment of the apparatus with the second frame in contact with the upper surface of the tool and the resilient members pressing the second frame onto the upper surface so that the composite charge can be formed; and FIG. 15 is a listing of at least a portion of the steps of a method for picking, placing, and forming composite charges over complex geometry tools resulting in a formed composite part.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the current invention references the accompanying drawings that illustrate specific embodiments in which the current invention can be practiced. The embodiments are intended to describe aspects of the current invention in sufficient detail to enable those skilled in the art to practice the current invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational terms, such as "up", down", "upper", "lower", "top", "bottom", "outer", "inner", etc., may be used throughout this description. These terms are used with reference to embodiments of the current invention and the orientations thereof shown in the accompanying figures. Embodiments of the current invention may be oriented in other ways. Therefore, the terms do not limit the scope of the present current invention.

An apparatus 10, constructed in accordance with various embodiments of the current invention, for picking, placing, and forming composite charges 12 over complex geometry tools 14 resulting in a formed composite part 16 is shown in FIGS. 1-11. The apparatus 10 may also interface with a robot 18 to implement the picking and placing operations. The apparatus 10 broadly comprises a robotic arm interface 20, a first frame 22, a second frame 24, a plurality of charge retainers 26, a plurality of heating elements 28, a plurality of actuators 30, a vacuum seal 32, and a vacuum bag 34.

Each composite charge 12 is a sheet of composite material that has a general shape similar to that of the formed composite part 16. In exemplary embodiments shown in the figures, the composite charge 12 has a generally rectangular shape, although other geometric shapes are possible. Composite material, as is known in the art, generally includes at least two constituent components—a reinforcement material and a matrix material. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. In the case of fiber-based reinforcement materials, the fiber may exist in one of at least two forms—either preimpregnated (prepreg), in which the fiber may be coated with a matrix material that is uncured and/or requires further heat treatment, such as uncured resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others.

The tool 14, as shown in FIGS. 5, 6, and 8-11, generally provides the shape of at least one surface that the formed composite part 16 should have. The tool 14 may be a male tool or a female tool and may have concave or convex curvatures, contours, indentations, protrusions, grooves, and other shapes or features. The tool 14 may be of any size, although typically the surface of the tool 14 which forms the formed composite part 16 is at least the size of the formed composite part 16. Since the tool 14 is utilized to form composite charges 12 and forces are applied to the tool 14, it is manufactured from rigid materials such as metals, alloys thereof, or other hardened materials. In some embodiments in which the tool 14 includes grooves or small-radius concave curved features, the tool 14 may further include, or be able to receive, plugs or other fillers that fit into the grooves which form an airtight vacuum seal during the forming process.

The robot 18, as shown in FIGS. 8-11, generally provides movement of the apparatus 10 from one location to another and provides force or pressure that is transferred to the second frame 24 to form airtight contact between the vacuum seal 32 and the tool 14 surface. The robot 18 may include at least one arm that couples to the robotic arm interface 20. The arm may be able to extend and retract in order to move the apparatus 10 from one location to another. Additionally, or alternatively, the robot 18 may include one or more translational stages that can move the arm, and thus the apparatus 10, from one location to another. Furthermore, the arm may be able to raise and lower the apparatus 10 along a vertical axis. In addition, the robot 18 may include actuating components that can apply a force or pressure, typically downward, to the apparatus 10. The robot 18 may include or be embodied by automated fiber placement (AFP) robotic systems. In addition, the robot 18 may operate in a three-dimensional space wherein the coordinates are known to a controller that controls the operation and motion of the robot 18 and the apparatus 10. The tool 14 is located within the operational space of the robot 18.

The robotic arm interface 20, as shown in FIGS. 1-6 and 8-11, generally provides coupling between the apparatus 10 and the robot 18 which moves the apparatus 10. The robotic arm interface 20 may include one or more plates, one or more mechanical connectors, and one or more electrical connectors.

The first frame 22, as shown in FIGS. 1-6 and 8-11, provides a structure to retain the actuators 30, the charge retainers 26, and the heating elements 28. The first frame 22 is formed from rigid or stiffened materials such as steel or aluminum and includes a first frame member 36 and a plurality of I-beams 38. The first frame member 36 has at least a rectangular perimeter shape, although nearly any geometric shape is possible. Generally, the shape of the perimeter of the first frame member 36 is similar to, or varies according to, the shape of the perimeter of the composite charge 12 and/or the shape of the formed composite part 16. The first frame member 36 includes an upper surface and a lower surface. In some embodiments, the first frame member 36 may be formed from a single sheet of material that includes a plurality of openings from the upper surface to the lower surface. Alternatively, the sheet of material may be solid with no openings. In other embodiments, the first frame member 36 may be formed from a plurality of flat beams connected to one another to form at least a rectangular perimeter shape, although the first frame member 36 may include additional beams connected to opposing sides of the perimeter to provide structural strength.

Exemplary embodiments of the first frame 22 include first and second I-beams 38 with the first I-beam 38 positioned one the upper surface along a first half of a central longitudinal axis of the first frame 22 and the second I-beam 38 positioned along a second half of the central longitudinal axis. The I-beams 38 provide structural support for the first frame 22 and connect the first frame 22 to the robotic arm interface 20.

The first frame 22 may also include a hat section 40 attached to the lower surface of the first frame member 36 along the central longitudinal axis. The hat section 40 includes a central wall positioned between two side walls perpendicular thereto.

The first frame 22 may further include first and second rails 42 attached to the lower surface of the first frame member 36 with each rail 42 being spaced apart from the central longitudinal axis.

The second frame 24, as shown in FIGS. 1-6 and 8-11, generally presses the vacuum seal 32 and the vacuum bag 34 against the surface of the tool 14 and the composite charge 12. The second frame 24 is formed from flexible or pliable materials including plastics or rubbers. An exemplary second frame 24 is formed from Plexiglas. The second frame 24 may include a second frame member that has at least a rectangular perimeter shape, although nearly any geometric shape is possible. Generally, the shape of the perimeter of the second frame member is similar to, or varies according to, the shape of the perimeter of the composite charge 12 and/or the shape of the formed composite part 16. The second frame member includes an upper surface and a lower surface. In some embodiments, the second frame member may be formed from a single sheet of material that includes a large central opening, leaving only a narrow perimeter edge. In other embodiments, the second frame member may be formed from a plurality of flat beams connected to one another to form at least a rectangular perimeter shape.

Figure 1:
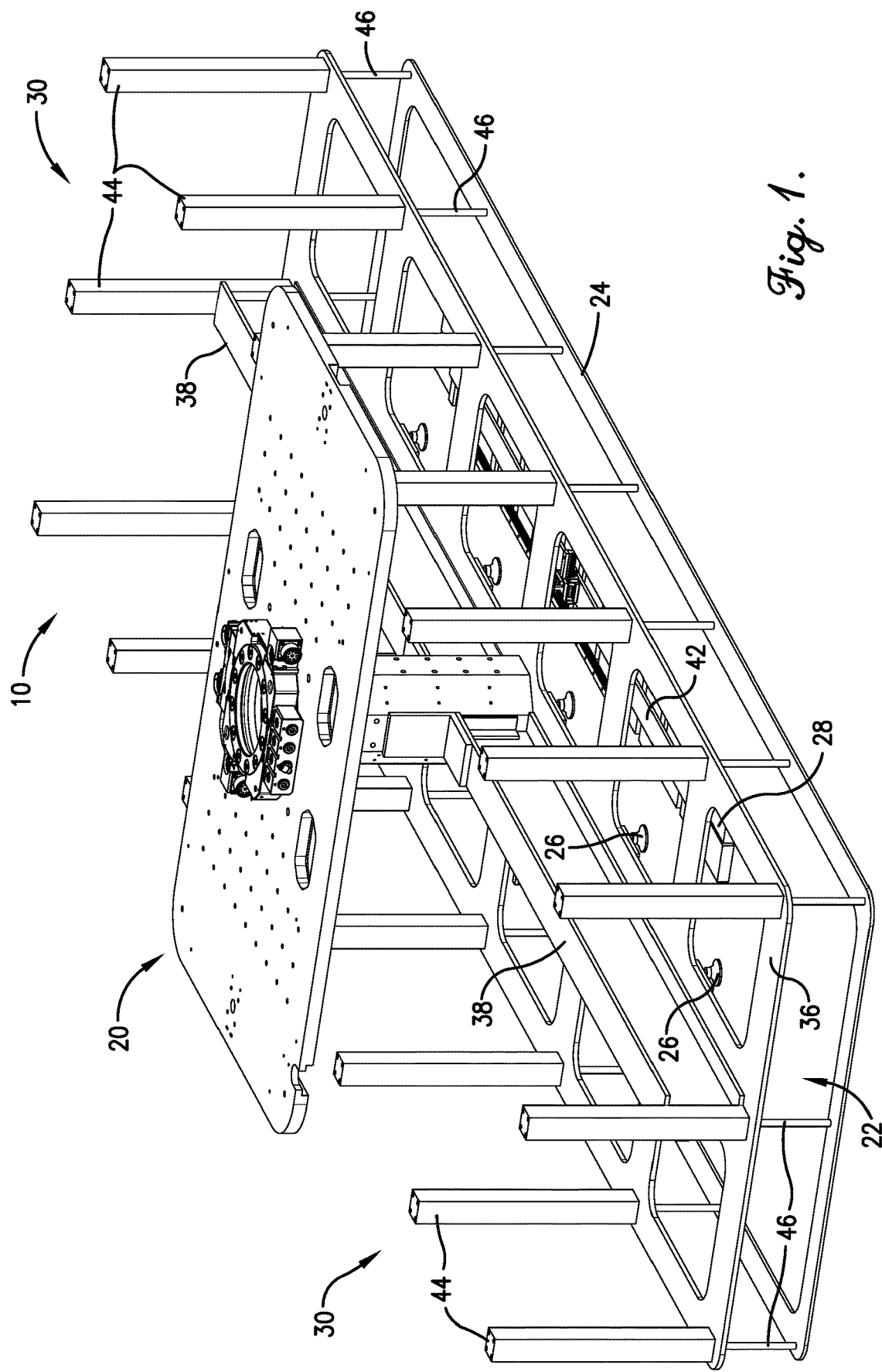
FIG. 1 is an upper perspective view of an apparatus, constructed in accordance with at least a first embodiment of the current invention, for picking, placing, and forming composite charges over complex geometry tools resulting in a formed composite part, the apparatus broadly comprising a first frame, a second frame, and a plurality of actuators.
Figure 2:
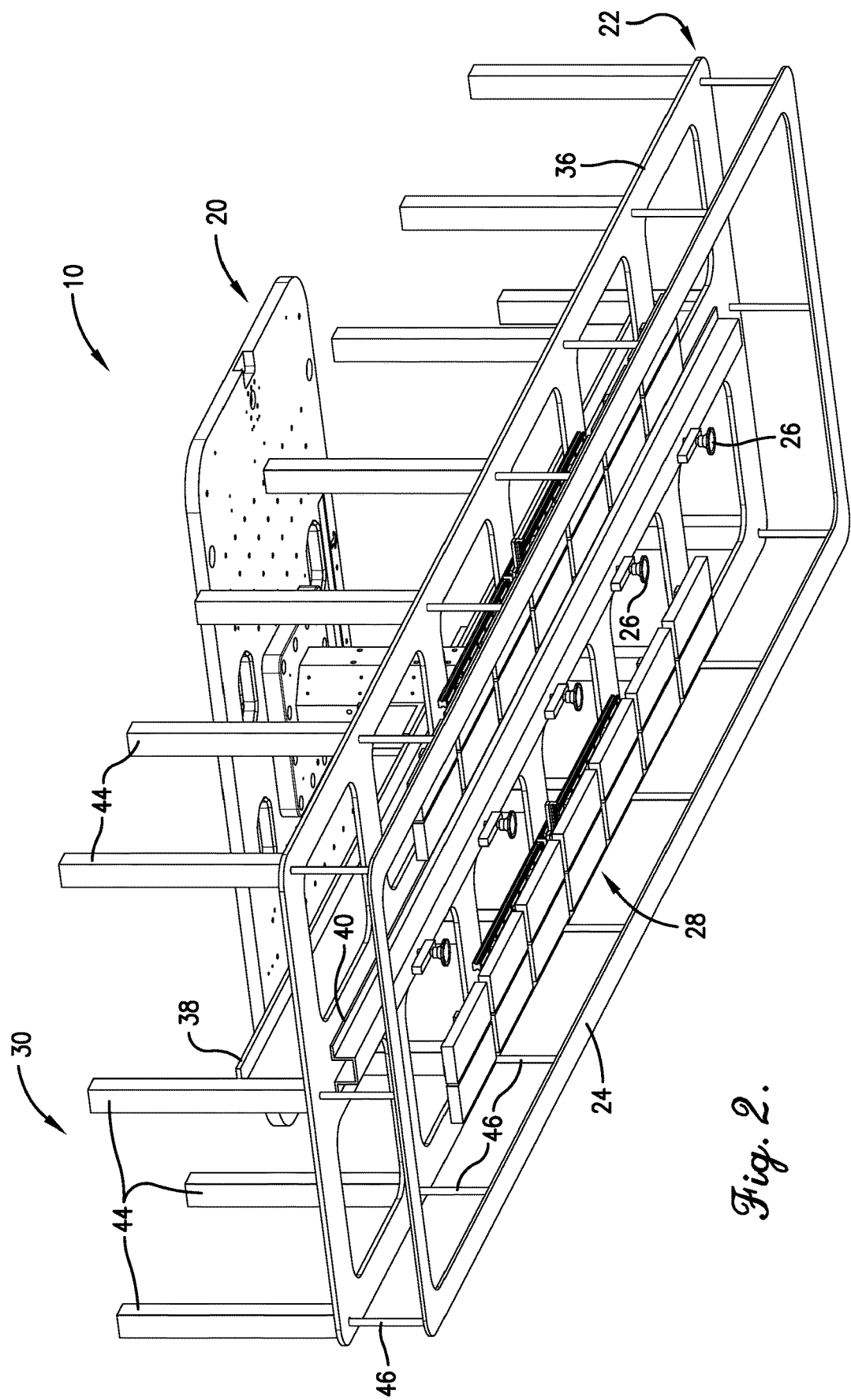
FIG. 2 is a lower perspective view of the apparatus which further comprises a plurality of charge retainers and a plurality of heating elements.
Figure 3:
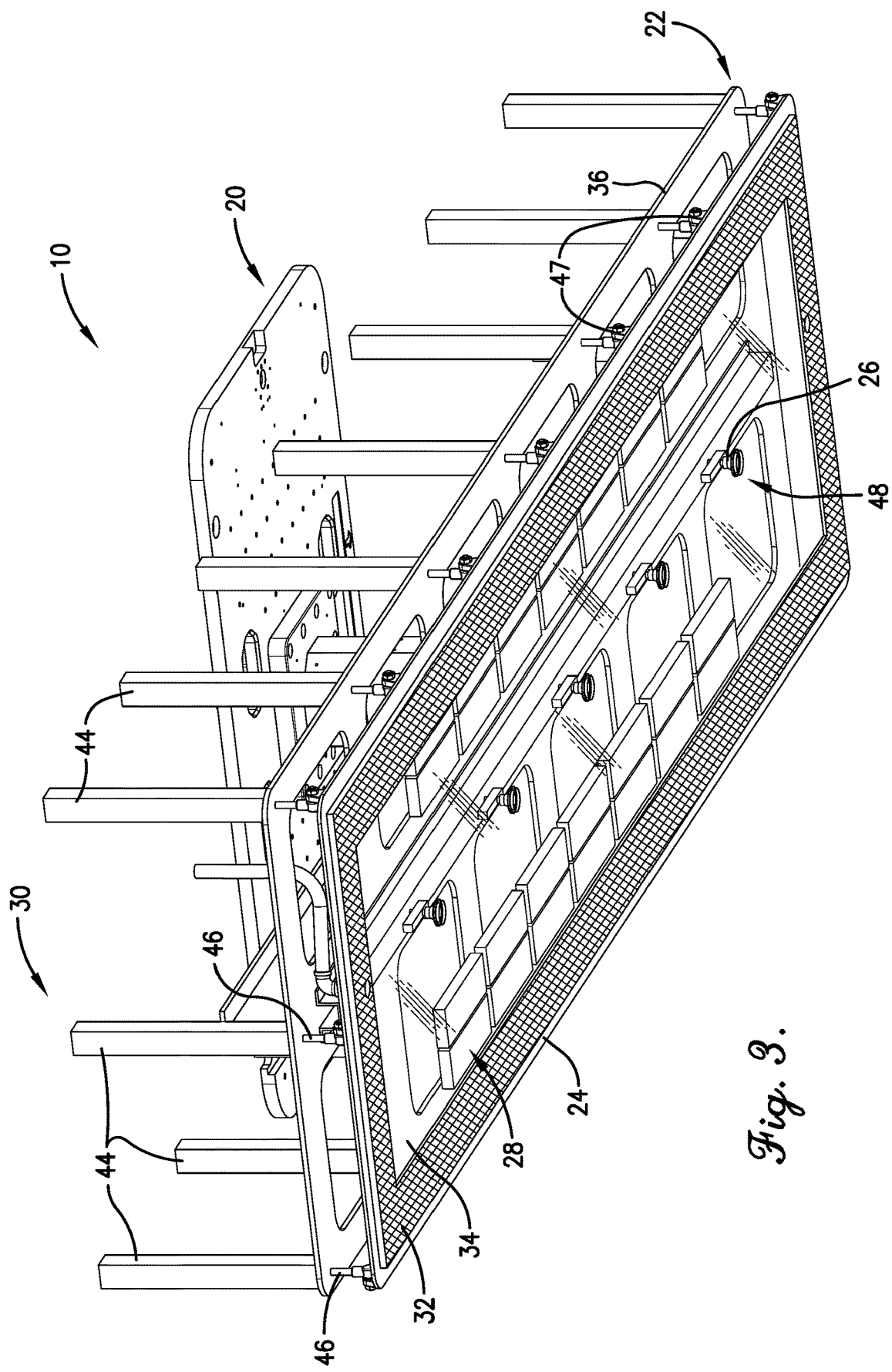
FIG. 3 is a lower perspective view of the apparatus, further comprising a vacuum seal and a vacuum bag attached to the second frame.

The charge retainers 26, as shown in FIGS. 1-3, generally provide retention of one composite charge 12 during picking, placing, and forming processes. Each charge retainer 26 may be embodied by passive retention devices such as suction cups or similar components that adhere to a surface or by active retention devices such as portal assemblies capable of applying vacuum to a surface. In some embodiments, the charge retainers 26 may include both passive and active devices. Furthermore, each charge retainer 26 may include, or be coupled to, an actuating mechanism capable of lowering and raising the charge retainer 26 in order to pick and place composite charges 12. The charge retainers 26 are connected to, and distributed along, the central wall of the hat section 40 of the first frame 22.

The heating elements 28, as shown in FIGS. 1-3, 5, and 6, generally provide heat to the composite charge 12 and may include electrically conductive elements, such as wires or cables, which heat up when electric current flows through them and which may be encased in an insulating material. Additionally, or alternatively, the heating elements 28 may include materials that undergo a chemical reaction to generate heat. A first portion of the heating elements 28 are retained by the first rail 42 and a second portion of the heating elements 28 are retained by the second rail 42.

The actuators 30 may be considered "dynamic mechanisms" in that they include one or more moving parts that respond to, or exert, a force. The actuators 30, as shown in FIGS. 1-6 and 8-11, generally provide extension or retraction of the second frame 24 with respect to the first frame 22. Each actuator 30 may be embodied by linear actuating devices or mechanisms, such as hydraulic actuators, pneumatic actuators, electrical actuators, gas springs, or the like. Thus, each actuator 30 may include a chamber 44 or cylinder, an arm 46, and a semi-rigid element 47, wherein the arm 46 may extend from and retract into the chamber 44. The semi-rigid element 47 is coupled to the moving end of the arm 46. Each actuator 30 may further include control circuitry or components that control the distance which the arm 46 extends from the chamber 44 or control the amount of force or pressure that the arm 46 can apply.

In some embodiments, the actuator 30 is configured such that the arm 46 is extended from the chamber 44 to its default axial length in the absence of an external force acting on the arm 46, but may be forced to retract into the chamber 44 by the application of a force to the arm 46. For example, an air cylinder filled with pressurized air may be used as the actuator 30 in such embodiments. In other embodiments, the arm 46 is resistant to displacement in response to externally applied forces, but moves only in response to an actuator drive mechanism. For example, an electrically driven ball screw actuator may be used as the actuator 30 in such embodiments. In some embodiments the chamber 44 may define a volume capable of retaining a fluid such as compressed air or hydraulic fluid. In other embodiments, the chamber 44 may not be capable of retaining a fluid, and may contain one or more aperture and/or may be entirely open on one or more sides. The chamber 44 may serve as a structural frame for the actuator 30 to provide guidance to the arm 46, and may limit the motion of the arm 46 to a single axis relative to the chamber 44. Furthermore, the arm 46 may remain in a neutral, or default, longitudinal or axial position in the absence of forces acting on the first frame 22 or the second frame 24.

The actuators 30 may be positioned and distributed along a perimeter of the first frame member 36 such that the chamber 44 of each actuator 30 is coupled to the upper surface of the first frame member 36 and the arm 46 extends through the lower surface to project away from, and below, the first frame member 36. The chamber 44 of each actuator 30 may be rigidly mounted to the first frame member 36. The arms 46 of the actuators 30 may move in a common direction relative to the first frame member 36.

The semi-rigid element 47 coupled to the moving end of the arm 46 of each actuator 30 is connected to the upper surface of the second frame 24. Thus, each actuator 30 and arm 46 can move a section of the second frame 24 and/or can apply a force to a section of the second frame 24. In exemplary embodiments shown in FIGS. 3-6, the semi-rigid element 47 includes a pivot joint with a U-shaped tab rotatably coupled to the moving end of the arm 46 through a pin. The U-shaped tab is also connected to the upper surface of the second frame 24 which allows the local section of the second frame 24 to bend or flex with respect to the arm 46. In other embodiments not shown in the figures, the semi-rigid element 47 may include a relatively short conical spring which allows for a small degree of lateral motion between the arm 46 and second frame 24 may prevent binding as the second frame 24 conforms to the contour of the tool 14. Generally, the semi-rigid element 47 allows for limited lateral or rotational motion between the moving end of the arm 46 and a corresponding location on the second frame 24, while still maintaining approximate lateral alignment between the arm 46 and second frame 24.

Figure 4:
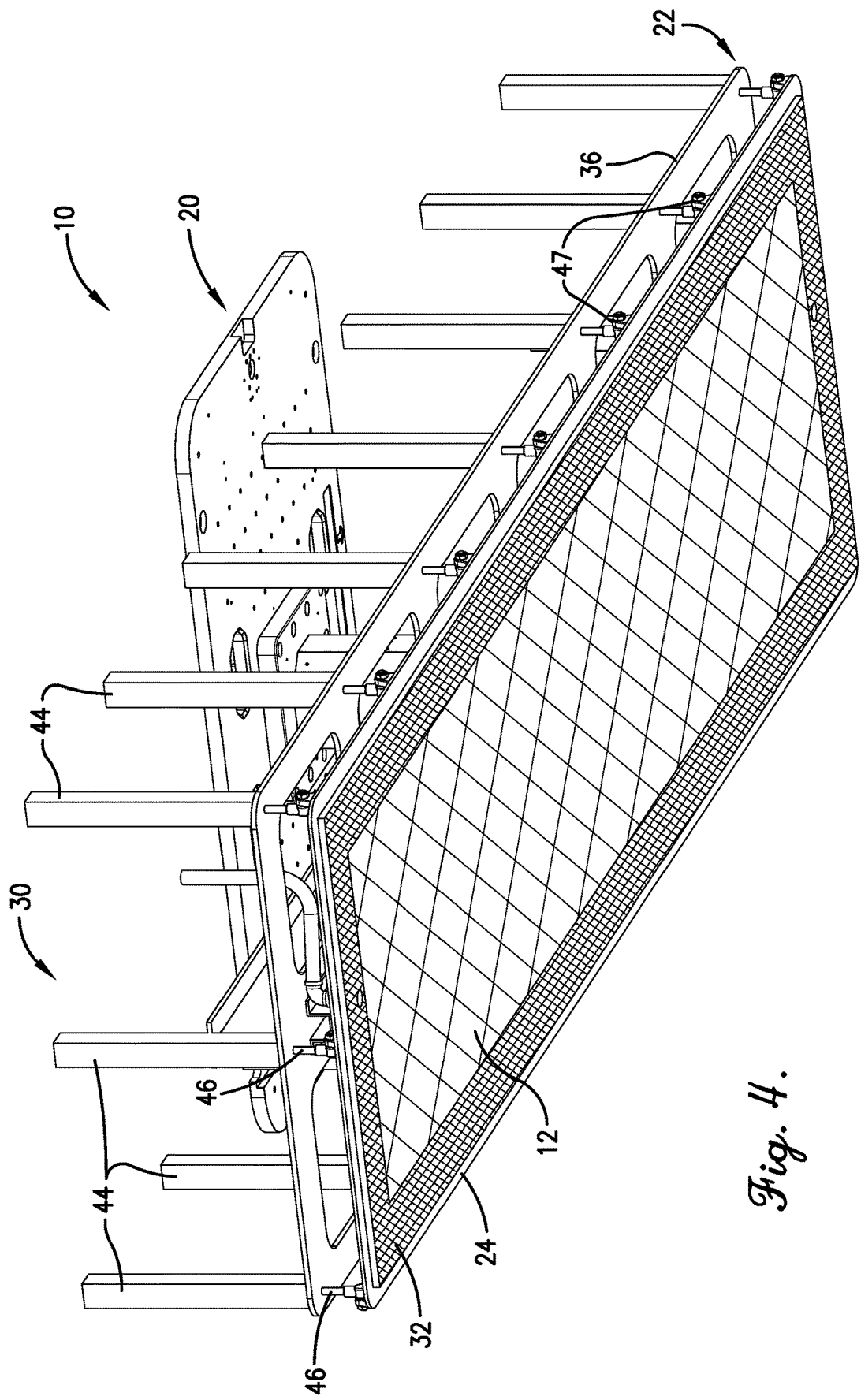
FIG. 4 is a lower perspective view of the apparatus, illustrating a composite charge being retained by the charge retainers.

The vacuum seal 32, as shown in FIGS. 3 and 4, generally provides an airtight seal or contact between the second frame 24 and the tool 14 during the forming process. The vacuum seal 32 may be formed from resilient pliable material such as silicones, elastomers, fluoroelastomers, compounds thereof and so forth. The vacuum seal 32, like the second frame 24, may have a shape that forms the perimeter of a rectangle, which is generally planar, although other shapes are possible. The vacuum seal 32 may be formed from a plurality of pieces of material attached to one another or from a single piece of material. The vacuum seal 32 may include one or more openings through which vacuum is applied. The vacuum seal 32 is attached to the bottom surface of the second frame 24 through the use of adhesives or the like.

Figure 6:
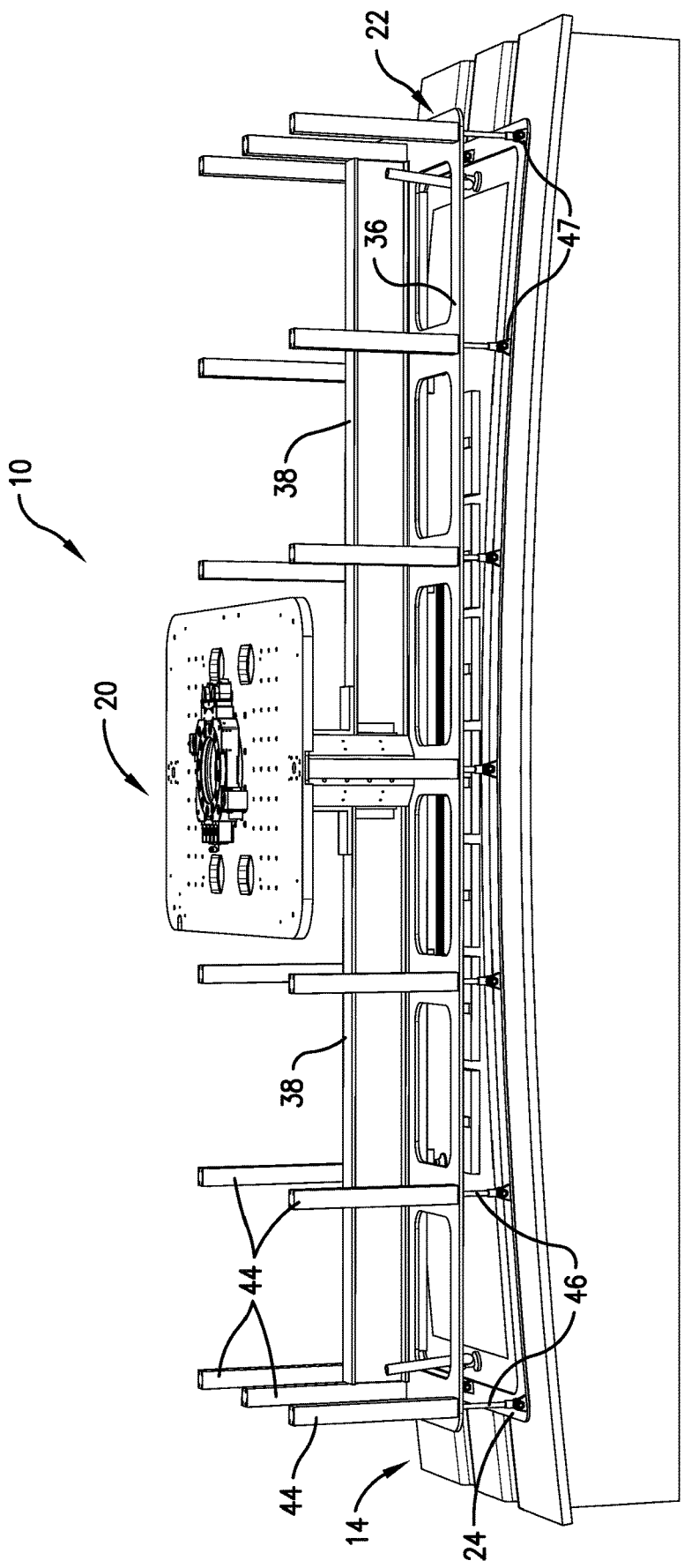
FIG. 6 is an upper perspective view of the apparatus with the second frame in contact with the upper surface of the tool and the arms of the actuators being extended to press the second frame onto the upper surface so that the composite charge can be formed.

The vacuum bag 34, as shown in FIGS. 3 and 6, generally provides uniform force or pressure on the composite charge 12 during the forming process. The vacuum bag 34 may be embodied by a thin flexible film or sheet of polymeric material that is capable of forming an airtight seal. The vacuum bag 34 may have a shape of a rectangle, although other shapes are possible. The vacuum bag 34 may include a plurality of openings 48 to which the charge retainers 26 are attached, such that a successive one of the charge retainers 26 is attached to each opening 48. The vacuum bag 34 is attached to the vacuum seal 32 such that an outer edge of the vacuum bag 34 is attached to, and perhaps overlaps with, an inner edge of the vacuum seal 32.

Figure 8:
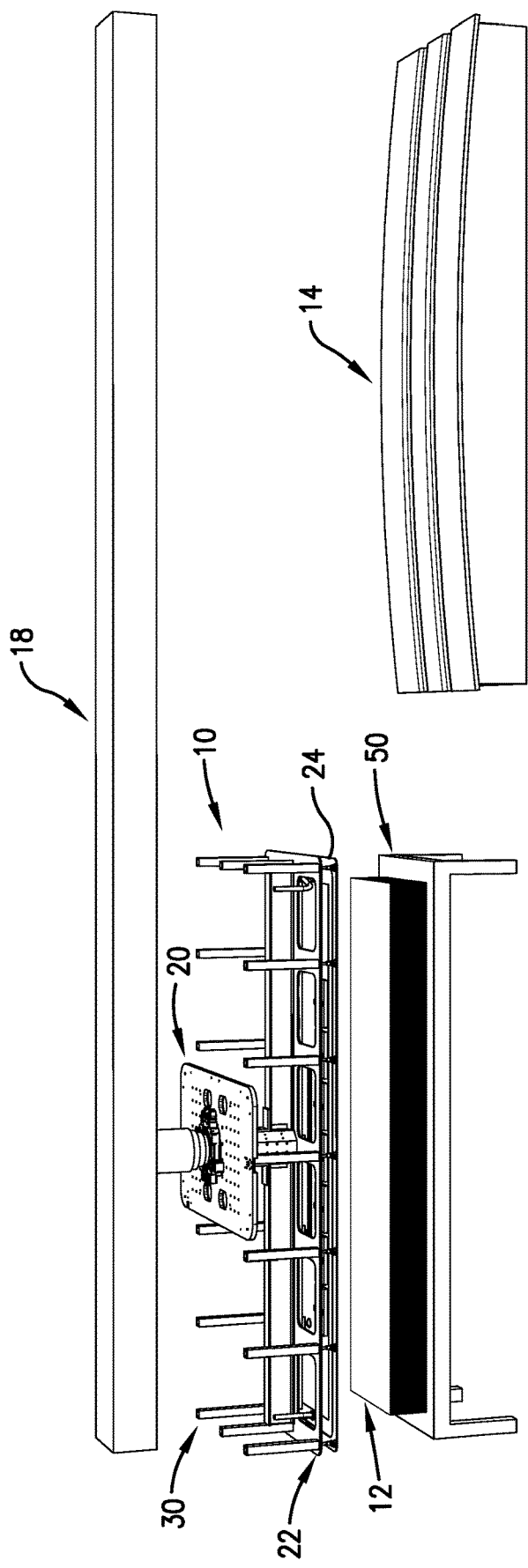
FIG. 8 is an environmental view of a system that utilizes a robot to move the apparatus, wherein the apparatus is held by a robotic arm over a stack of composite charges waiting to be formed.
Figure 9:
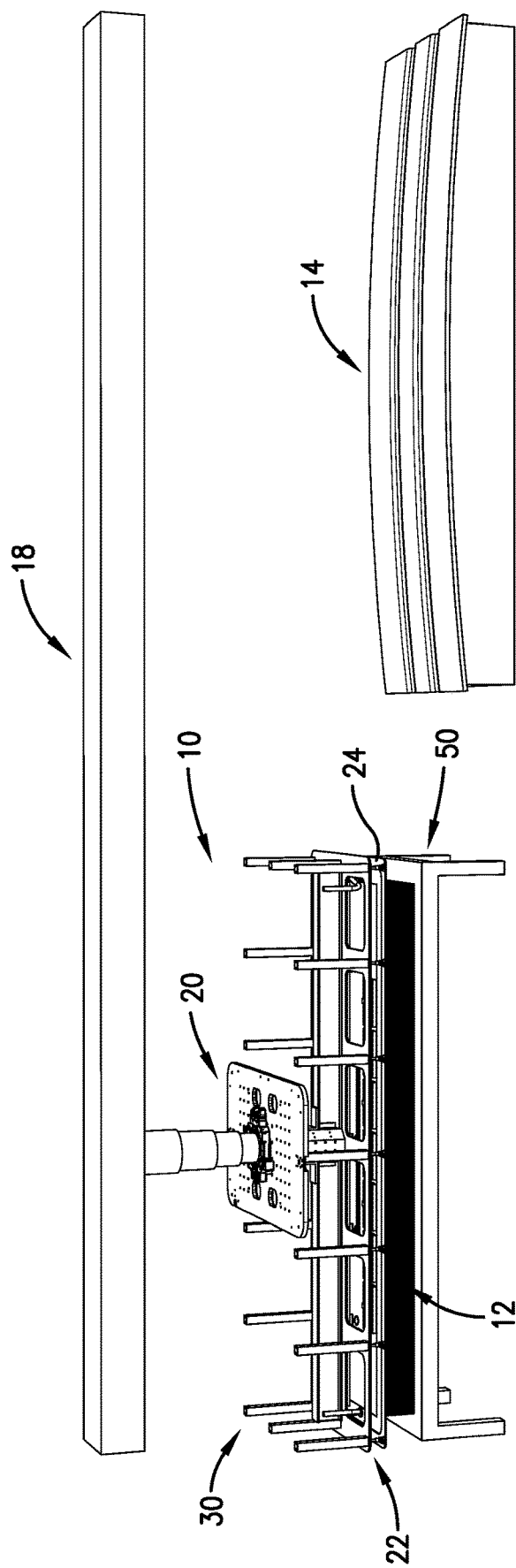
FIG. 9 is an environmental view of the robot lowering the apparatus to pick up a composite charge.

The picking, placing, and forming processes may be implemented as follows, with reference to FIGS. 8-11. A plurality of composite charges 12, typically placed in a stack, is located on a table 50 that is in the vicinity of the tool 14. In some embodiments, the table 50 and the tool 14 may be parts of the same structure or may be positioned adjacent one another. The robot 18 may align the apparatus 10 above the stack of composite charges 12, as shown in FIG. 8, and then lower the apparatus 10 onto the composite charges 12 until the charge retainers 26 contact the top composite charge 12, as shown in FIG. 9. Vacuum may be applied to the charge retainers 26 and/or some downward force may be applied so that the charge retainers 26 retain or hold the composite charge 12. The composite charge 12 being retained by the apparatus 10, as viewed from below the apparatus 10 is shown in FIG. 4. While the composite charge 12 is retained by the charge retainers 26, an upper surface of the composite charge 12 is in contact with a lower surface of the vacuum seal 32.

Figure 5:
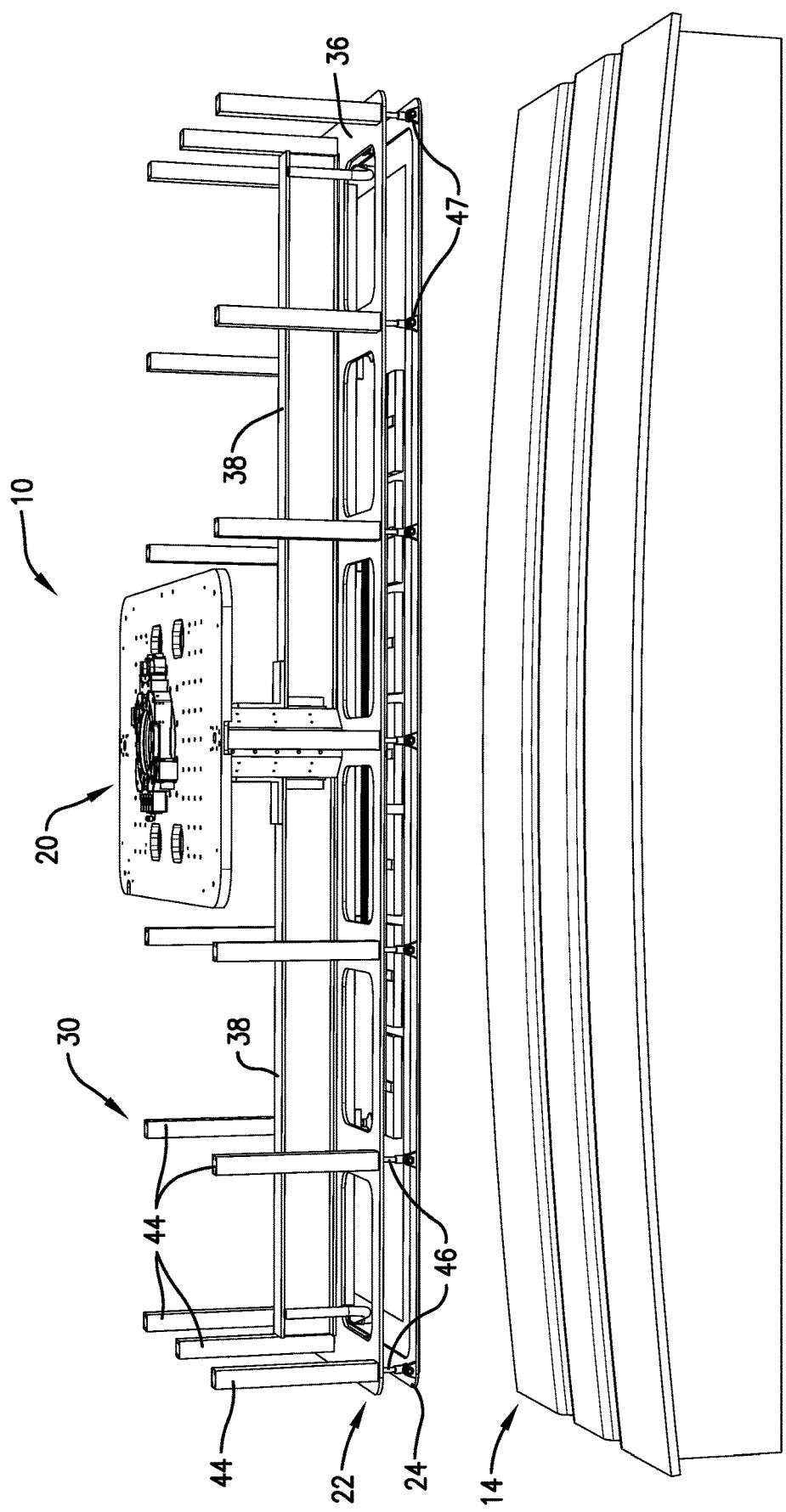
FIG. 5 is an upper perspective view of the apparatus, retaining the composite charge and being lowered onto an upper surface of a forming tool.
Figure 10:
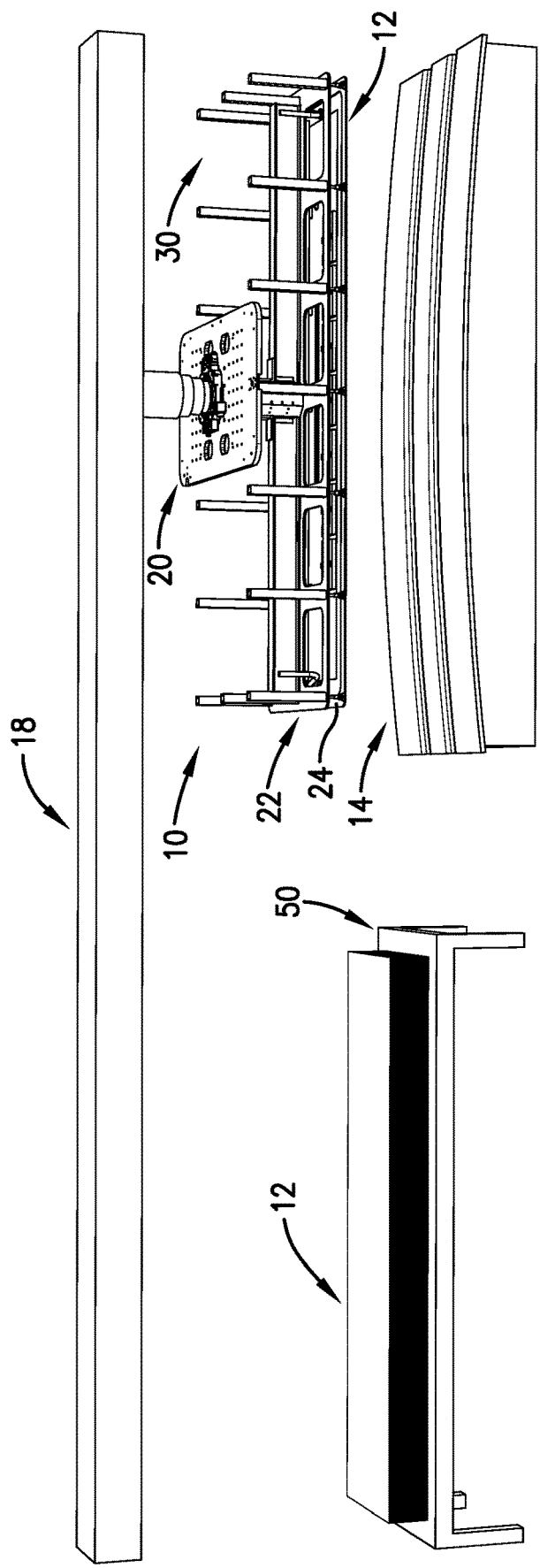
FIG. 10 is an environmental view of the robot moving the apparatus, which retains a composite charge, to the forming tool.
Figure 11:
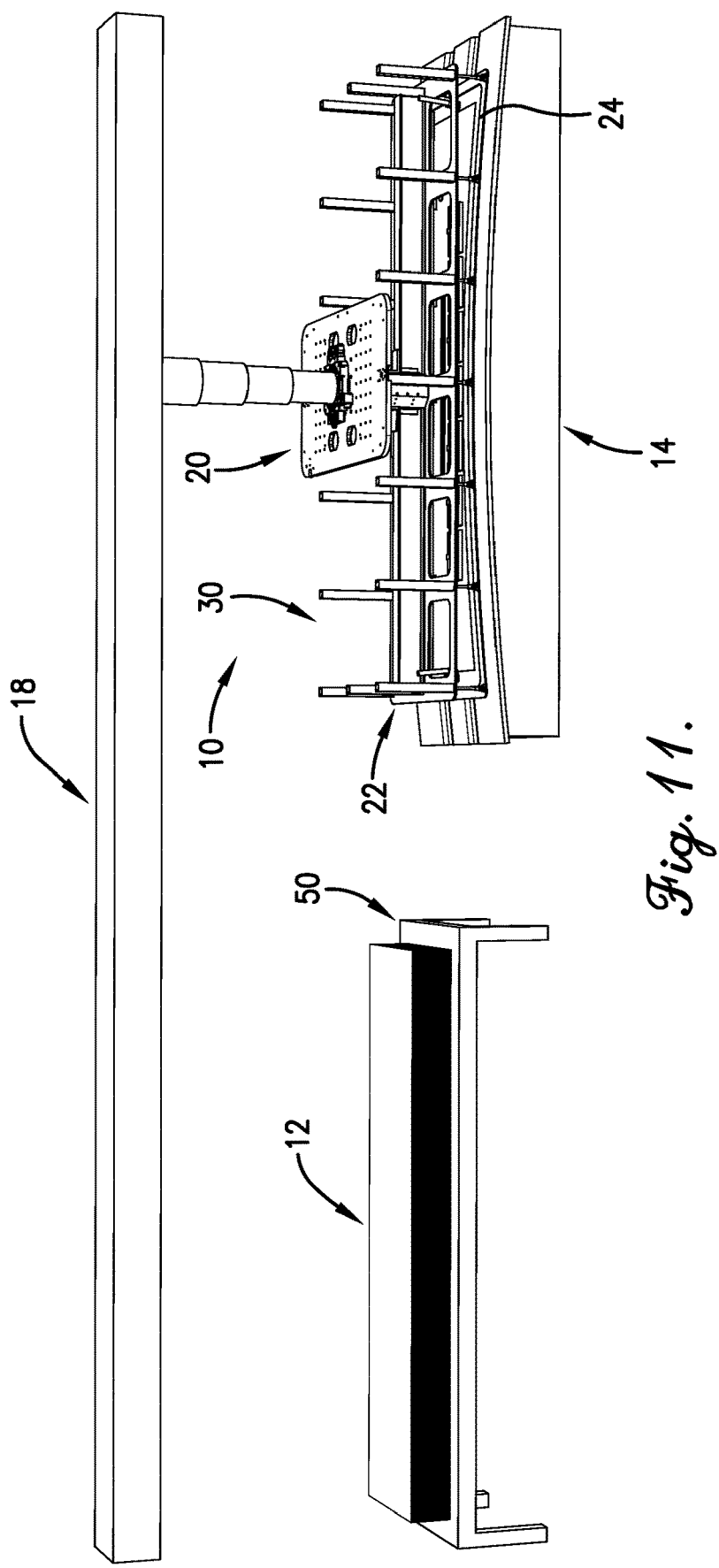
FIG. 11 is an environmental view of the robot lowering the apparatus with the arms of the actuators being extended to press the second frame onto the upper surface so that the composite charge can be formed.

With the charge retainers 26 retaining the composite charge 12, the robot 18 then picks up the apparatus 10 and the composite charge 12 and moves them above, and in alignment with, the tool 14, as shown in FIGS. 5 and 10. The robot 18 lowers the apparatus 10 to place the composite charge 12 onto the top surface of the tool 14. As the apparatus 10 lowers, various sections of the second frame 24 progressively contact the upper surface of the tool 14. The actuators 30 may retract and/or extend the arms 46, which changes the shape of the second frame 24 by raising and/or lowering sections of the second frame 24, depending on the location of the actuator 30 and where on the tool 14 the associated section of the second frame 24 is making contact. For example, those actuators 30 coupled to the second frame 24 in locations that contact lower, or recessed, areas of the tool 14 may extend their arms 46 to push the associated section of the second frame 24 downward to engage the upper surface of the tool 14. Those actuators 30 coupled to the second frame 24 in locations that contact higher, or raised, areas of the tool 14 may retract their arms 46 to lift the associated section of the second frame 24 upward to engage the upper surface of the tool 14. Alternatively, those actuators 30 coupled to the second frame 24 in locations that contact the highest point(s) of the tool 14 may not extend or retract their arms 46 at all, while all of the other actuators 30 extend their arms 46 the appropriate amount to push the associated section of the second frame 24 downward to engage the upper surface of the tool 14. The apparatus 10 in its lowest position with the second frame 24 in full contact with the tool 14 is shown in FIGS. 6 and 11.

In other embodiments, the arms 46 of the actuators 30 may passively respond to compressive forces resulting from the robot 18 lowering the apparatus 10 onto the tool 14. Higher points on the tool 14 push the arms 46 into the chambers 44 more so than do lower points of the tool 14 while the second frame 24 flexes and bends to conform to the shape of the upper surface of the tool 14. Thus, it is possible that once the apparatus 10 has been completely lowered that none of the arms 46 are extended from their neutral longitudinal length and some or all of the arms 46 are retracted into their chambers 44 at varying lengths.

At some point in time after the charge retainers 26 have picked up the composite charge 12 and before vacuum is applied for the forming process, as described below, the heating elements 28 may be activated in order to warm the composite charge 12. The heating elements 28 may warm the composite charge 12 so that it is less stiff and more pliable and relaxed.

Figure 7:
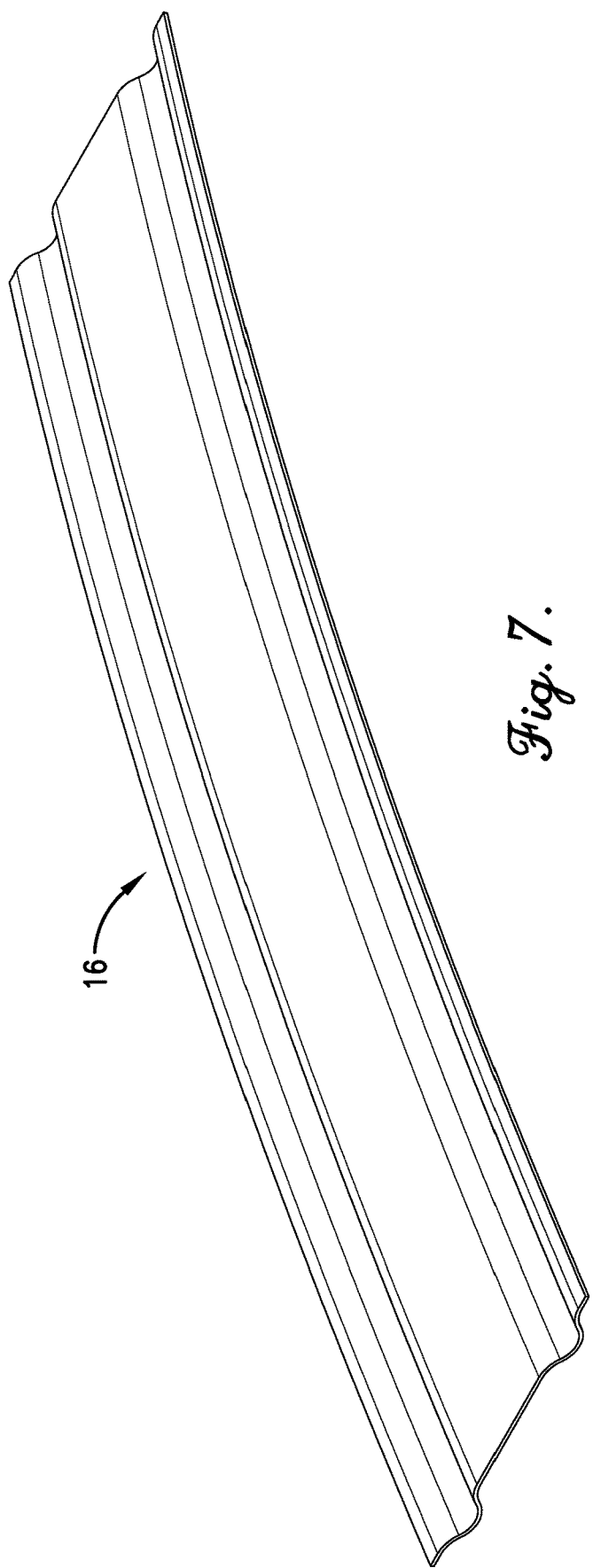
FIG. 7 is an upper perspective view of the formed composite part.

With the actuators 30 adjusted (with the proper amount of arm 46 extension and/or retraction), or set (with the arms 46 responding properly to compressive forces), for the second frame 24 to contact and conform to the upper surface of the tool 14, the vacuum seal 32 is also pressed on to the upper surface of the tool 14 to form an airtight seal between the vacuum bag 34 and the upper surface of the tool 14. In embodiments where the tool 14 includes grooves or small-radius concave curved features, plugs may be inserted into the grooves in order to complete the airtight seal. Vacuum is applied through the ports in the openings of the vacuum seal 32. Vacuum applied through the vacuum seal 32 pulls the vacuum bag 34 against the composite charge 12 which in turn presses the composite charge 12 into the upper surface of the tool 14 so that the charge 12 conforms to the shape of the tool 14. After a period of time, vacuum is no longer applied. The formed composite part 16, as shown in FIG. 7, is complete.

In some embodiments, suction or vacuum to the charge retainers 26 may still be applied, and the robot 18 may raise the apparatus 10 along with the formed composite part 16 and move the combination to a location where the formed composite part 16 is released. The robot 18 may then transport the apparatus 10 back to the composite charge 12 stack location to begin the picking, placing, and forming processes again.

In other embodiments, suction or vacuum to the charge retainers 26 is no longer applied, and the apparatus 10 may be raised by the robot 18 and transported back to the composite charge 12 stack location to begin the picking, placing, and forming processes again. The formed composite part 16 may be retrieved from the tool 14 by a technician or by a second robot which may move the formed composite part 16 to another location.

Figure 12:
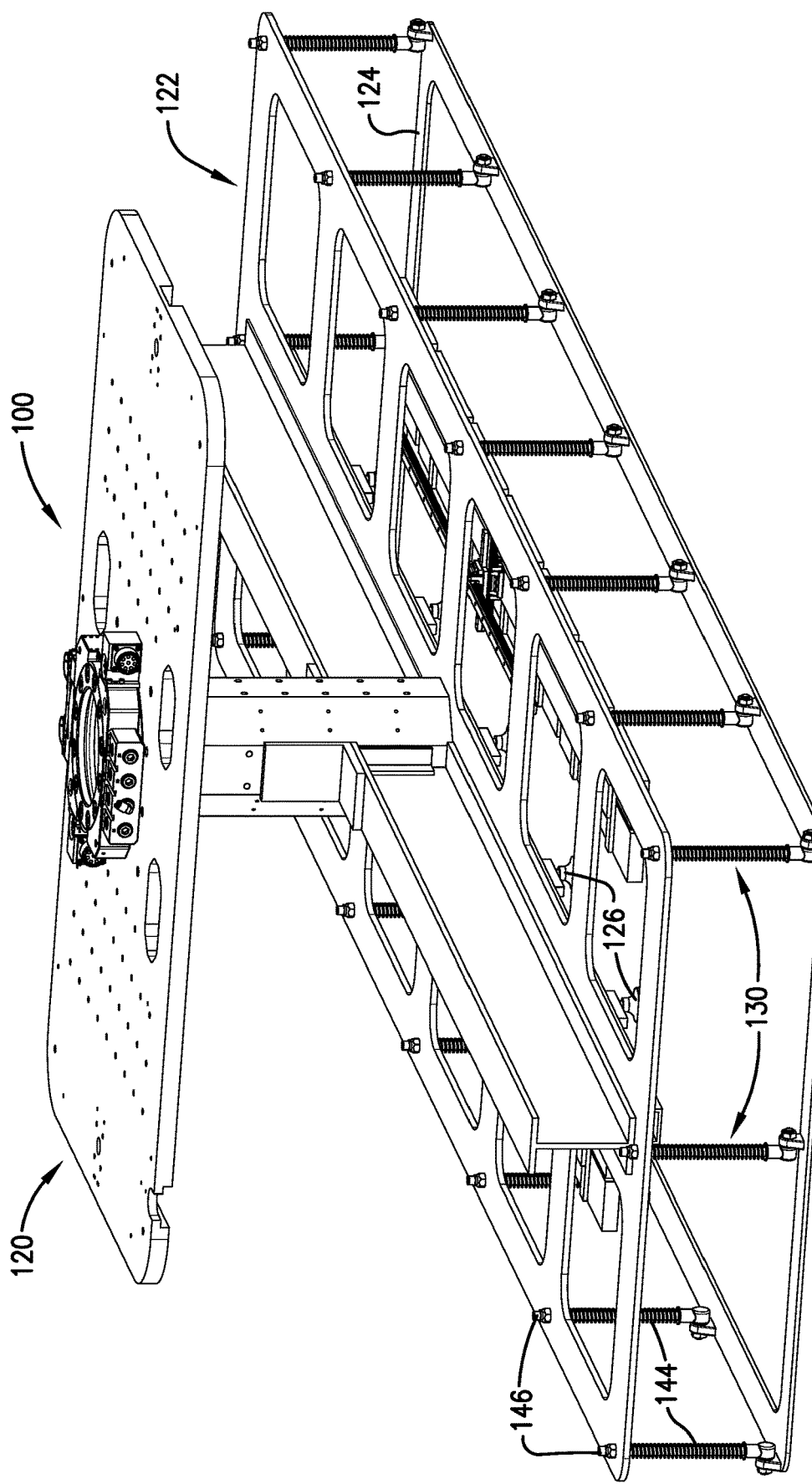
FIG. 12 is an upper perspective view of a second embodiment of the apparatus, wherein the apparatus includes a plurality of resilient members instead of the actuators.
Figure 13:
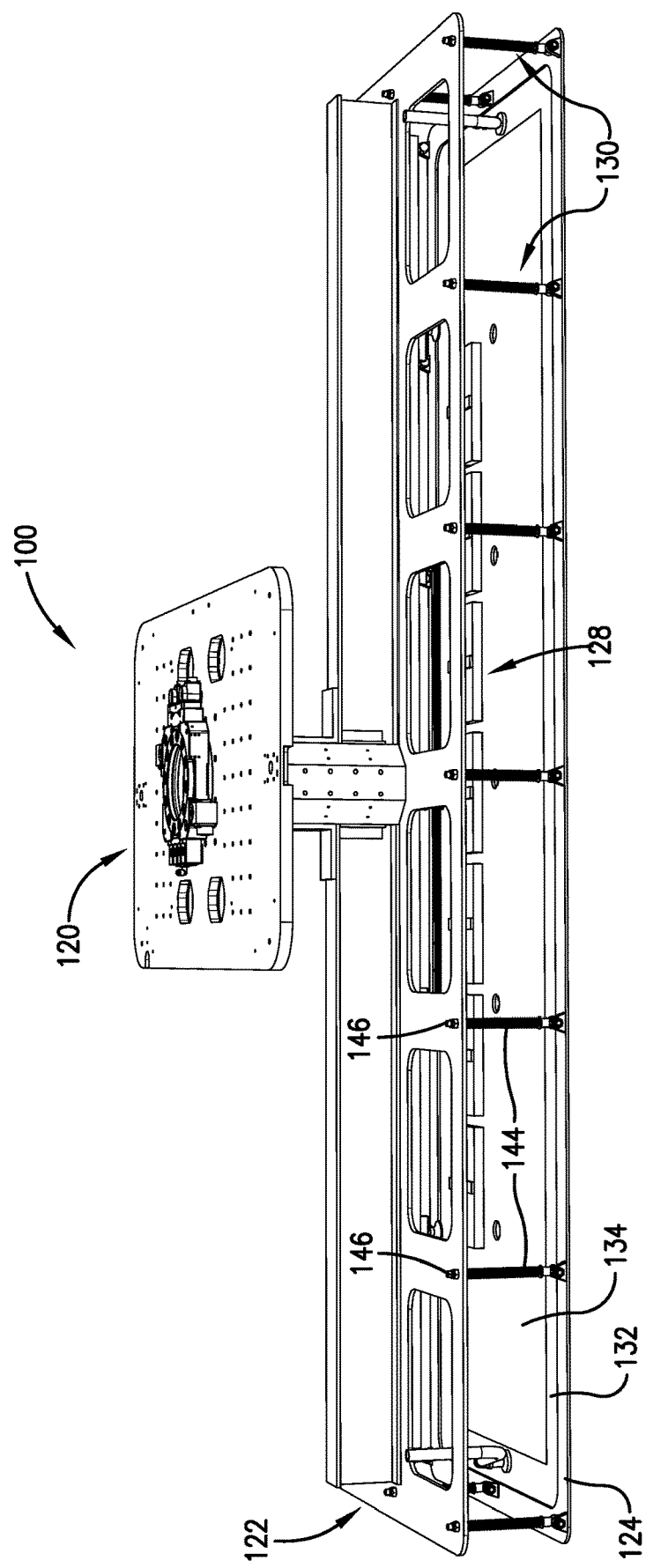
FIG. 13 is an upper perspective view of the second embodiment of the apparatus including the vacuum seal and the vacuum bag.

A second embodiment of the apparatus 100 is shown in FIGS. 12-14. The apparatus 100 includes a robotic arm interface 120, a first frame 122, a second frame 124, a plurality of charge retainers 126, a plurality of heating elements 128, a vacuum seal 132, and a vacuum bag 134. The listed components of the apparatus 100 is substantially similar to like-named components of the apparatus 10 in structure, function, and operation. But, the apparatus 100 has the following exceptions. Instead of including actuators 30 that actively apply forces to the second frame 124, the apparatus 100 includes a plurality of resilient members 130 that passively applies forces to the second frame 124.

The resilient members 130 may be considered "dynamic mechanisms" in that they include one or more moving parts that respond to, or exert, a force. Each resilient member 130 may include a spring 144 or a coil wrapped around a center rod 146, so that the center rod 146 is positioned along the central longitudinal axis of the spring 144. A first end of the spring 144 of each resilient member 130 is rigidly attached to the first frame 122, while a second, opposing end of the spring 144 is rigidly attached to the second frame 124. A first end of the center rod 146 of each resilient member 130 is rigidly attached to the second frame 124, while a second, opposing end of the center rod 146 includes a bolt, or similar fastener, such that the second end of the center rod 146 moves freely with respect to the first frame 122, but cannot be pulled through from the upper surface to the lower surface of the first frame 122. This structure allows the center rods 146 and bolts, and not the springs 144, to support the weight of the second frame 124 when the apparatus 100 is lifted. With the resilient members 130 being connected between the first frame 122 and the second frame 124, the resilient members 130 generally apply a force to oppose displacement of the second frame 124 with respect to the first frame 122, wherein the force generally corresponds to, is proportional to, or varies according to, the amount of displacement.

In some embodiments, the first end of the center rod 146 of each resilient member 130 may be pivotally attached to the second frame 124. In some embodiments, the first end of the center rod 146 of each resilient member 130 may be coupled to the second frame 124 by means of a semi-rigid element (not shown) allowing for limited lateral motion between the first end of the center rod 146 and a corresponding location on the second frame 124. The semi-rigid element may be a relatively short conical spring. Allowing for a small degree of lateral motion between the center rod 146 and second frame 124 may prevent binding as the second frame 124 conforms to the contour of the tool 14. In some embodiments, an intermediate frame (not shown) may be interposed between the first frame 122 and the second frame 124. The first end of the center rod 146 may be attached to one side of the intermediate frame, semi-rigid element may be attached to the other side of the intermediate frame.

When the apparatus 100 places a composite charge 12 for forming, the robot 18 lowers the apparatus 100 on to the tool 14, various sections of the second frame 124 contact the upper surface of the tool 14. As this happens, those sections of the second frame 124 displace upward. In response, the resilient members 130 in those sections exert a downward force to oppose the displacement. The robot 18 continues to lower the apparatus 100 until all sections of the second frame 124 contact the upper surface of the tool 14. The robot 18 may apply an additional downward force to ensure that the vacuum seal 132 has formed an airtight bond with the upper surface of the tool 14. Given that some areas of the upper surface of the tool 14 have a greater height than others, the resilient members 130 in the corresponding sections of the second frame 124 experience a greater displacement. It is possible that the springs 144 of the resilient members in those sections may be chosen to have smaller spring constants in order to balance the amount of downward force applied to the upper surface of the tool 14 by all of the resilient members 130.

FIG. 15 depicts a listing of at least a portion of the steps of an exemplary method 200 for picking, placing, and forming a composite charge 12 over a complex geometry tool 14. The steps may be performed in the order shown in FIG. 15, or they may be performed in a different order. Furthermore, some steps may be performed concurrently as opposed to sequentially. In addition, some steps may be optional or may not be performed.

Referring to step 201, an apparatus 10, 100 including a plurality of charge retainers 26, 126 is lowered onto the composite charge 12 so that the charge retainers 26, 126 contact and retain the composite charge 12. The composite charge 12 may reside on a stack of composite charges 12 placed on a table 50. The apparatus 10, 100 may further include a robotic arm interface 20, 120, a first frame 22, 122, a second frame 24, 124, a plurality of heating elements 28, 128, a vacuum seal 32, 132, and a vacuum bag 34, 134. These components have a structure, function, and operation as described above. In some embodiments, the apparatus 10 includes a plurality of actuators 30, while in other embodiments, the apparatus 100 includes a plurality of resilient members 130, also as described above. Furthermore, the apparatus 10, 100 interfaces with a robot 18 which lowers the apparatus 10, 100 onto the composite charge 12.

Referring to step 202, the apparatus 10, 100 and the retained composite charge 12 are moved to a tool 14 used for forming. The robot 18 raises the apparatus 10, 100 and the composite charge 12 from the stack of composite charges 12 and moves the combination to be aligned with, and positioned above, the tool 14.

Referring to step 203, the apparatus 10, 100 and the composite charge 12 are lowered onto an upper surface of the tool 14 so that the second frame 24, 124 conforms to a shape of the tool 14 and presses the vacuum seal 32, 132 against the tool 14. The vacuum seal 32, 132 is attached to the bottom surface of the second frame 24, 124. Pressing the vacuum seal 32, 132 against the tool 14 also forms an airtight seal between the vacuum bag 34 and the upper surface of the tool 14. In embodiments where the tool 14 includes grooves or small-radius concave curved features, plugs may be inserted into the grooves in order to complete the airtight seal.

The robot 18 lowers the apparatus 10, 100 and the composite charge 12 onto the upper surface of the tool 14 so that the second frame 24, 124 contacts the tool 14. The robot 18 then at least maintains the position of the apparatus 10, 100. Given that the second frame 24, 124 is formed from flexible material, it can conform to the shape of the upper surface of the tool 14. In some embodiments, the second frame 24 is coupled to the rigid first frame 22 by the actuators 30, such that the arm 46 of each actuator 30 is able to extend from the chamber 44 and change the shape of the second frame 24. Furthermore, the extension of the arms 46 also applies a force, or forces, to the second frame 24. In other embodiments, the second frame 124 is coupled to the rigid first frame 122 by the resilient members 130, which generally apply a force to oppose displacement of the second frame 124 with respect to the first frame 122.

At some point in time after the charge retainers 26, 126 have picked up the composite charge 12 and before vacuum is applied in the following step, the heating elements 28, 128 may be activated in order to warm the composite charge 12. The heating elements 28, 128 may warm the composite charge 12 so that it is less stiff and more pliable and relaxed.

Referring to step 204, a vacuum is applied through the vacuum seal 32, 132 so that the vacuum bag 34, 134 pulls the composite charge 12 against the upper surface of the tool 14. Vacuum applied through the vacuum seal 32, 132 pulls the vacuum bag 34, 134 against the composite charge 12 which in turn presses the composite charge 12 into the upper surface of the tool 14 so that the charge 12 conforms to the shape of the tool 14.

Referring to step 205, the vacuum through the vacuum seal 32 is no longer applied. The formed composite part 16, as shown in FIG. 7, is complete.

In some embodiments, suction or vacuum to the charge retainers 26 may still be applied, and the robot 18 may raise the apparatus 10 along with the formed composite part 16 and move the combination to a location where the formed composite part 16 is released. The robot 18 may then transport the apparatus 10 back to the composite charge 12 stack location to begin the picking, placing, and forming processes again.

In other embodiments, suction or vacuum to the charge retainers 26 is no longer applied, and the apparatus 10 may be raised by the robot 18 and transported back to the composite charge 12 stack location to begin the picking, placing, and forming processes again. The formed composite part 16 may be retrieved from the tool 14 by a technician or by a second robot which may move the formed composite part 16 to another location.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for picking, placing, and forming a composite charge over a forming tool, the method comprising:
   lowering an apparatus including a plurality of charge retainers onto the composite charge so that the charge retainers contact and retain the composite charge;
   moving the apparatus and the composite charge to the forming tool;
   lowering the apparatus and the composite charge onto an upper surface of the forming tool so that a flexible frame of the apparatus contacts the forming tool and conforms to the shape of the forming tool and presses a vacuum seal against the forming tool, the apparatus including a plurality of dynamic mechanisms connected to the flexible frame which apply a force to oppose displacement of the flexible frame when it contacts the forming tool;
   applying a vacuum through the vacuum seal so that a vacuum bag pulls the composite charge against the upper surface of the forming tool; and
   releasing the vacuum through the vacuum seal and raising the apparatus from the forming tool.

2. The method of claim 1, further comprising heating the composite charge before applying the vacuum.

3. The method of claim 1, further comprising extending or retracting a plurality of actuator arms that are connected to a rigid frame so that a shape of the flexible frame is changed.

4. The method of claim 1, wherein each dynamic mechanism includes a spring.

5. A method for picking, placing, and forming a composite charge over a forming tool, the method comprising:
   lowering an apparatus including a plurality of charge retainers onto the composite charge so that the charge retainers contact and retain the composite charge;
   moving the apparatus and the composite charge to the forming tool;
   lowering the apparatus and the composite charge onto an upper surface of the forming tool so that a flexible frame of the apparatus contacts the forming tool and conforms to the shape of the forming tool and presses a vacuum seal against the forming tool, the apparatus including a plurality of dynamic mechanisms connected to the flexible frame which apply a force to oppose displacement of the flexible frame when it contacts the forming tool;
   extending or retracting a plurality of actuator arms that are connected to a rigid frame so that a shape of the flexible frame is changed;
   heating the composite charge;
   applying a vacuum through the vacuum seal so that a vacuum bag pulls the composite charge against the upper surface of the forming tool; and
   releasing the vacuum through the vacuum seal and raising the apparatus from the forming tool.

6. The method of claim 5, wherein each dynamic mechanism includes a spring.

* * * * *